United States Patent
Poirier et al.

(10) Patent No.: US 11,578,700 B2
(45) Date of Patent: Feb. 14, 2023

(54) METHOD AND DEVICE FOR MANAGING THE OFFTAKE OF POWER PRODUCED BY AN AUXILIARY POWER UNIT OF AN AIRCRAFT AND AIRCRAFT EQUIPPED WITH SAID POWER OFFTAKE MANAGEMENT DEVICE

(71) Applicants: Airbus Operations SAS, Toulouse (FR); Airbus SAS, Blagnac (FR); Airbus Operations S.L., Getafe (ES)

(72) Inventors: Didier Poirier, Blagnac (FR); Etienne Foch, Toulouse (FR); Guillaume Alix, Toulouse (FR); Nicolas Chauvet, Toulouse (FR); Paul-Emile Roux, Toulouse (FR); Souhaib Boukaya, Toulouse (FR); Marcos Javier Chibrando, Getafe (ES)

(73) Assignees: Airbus Operations SAS, Toulouse (FR); Airbus SAS, Blagnac (FR); Airbus Operations S.L., Getafe (ES)

( * ) Notice: Subject to any disclaimer, the term of this patent is extended or adjusted under 35 U.S.C. 154(b) by 0 days.

(21) Appl. No.: 17/391,816

(22) Filed: Aug. 2, 2021

(65) Prior Publication Data

US 2022/0042492 A1 Feb. 10, 2022

(30) Foreign Application Priority Data

Aug. 4, 2020 (FR) ...................................... 2008258

(51) Int. Cl.
*F03D 15/00* (2016.01)
*F03D 9/25* (2016.01)
(Continued)

(52) U.S. Cl.
CPC ............. *F03D 15/00* (2016.05); *B64D 41/00* (2013.01); *F02C 6/08* (2013.01); *F03D 9/25* (2016.05);
(Continued)

(58) Field of Classification Search
CPC ..... F03D 9/25; F03D 9/28; F03D 9/32; F03D 15/00; B64D 41/00; B64D 2013/0611; F02C 6/08; F05D 2220/50
See application file for complete search history.

(56) References Cited

U.S. PATENT DOCUMENTS

2008/0179947 A1* 7/2008 Suttie .................... F02C 9/42
307/68
2017/0044989 A1* 2/2017 Gemin .................... F02C 3/04
(Continued)

FOREIGN PATENT DOCUMENTS

EP 3336329 A1 6/2018

OTHER PUBLICATIONS

French Search Report; priority document.

*Primary Examiner* — Audrey B. Walter
(74) *Attorney, Agent, or Firm* — Greer, Burns & Crain, Ltd.

(57) ABSTRACT

A method for managing the offtake of power produced by an auxiliary power unit of an aircraft. The method comprises a step of calculating a maximum capacity for offtake of mechanical power that the auxiliary power unit can provide to the aircraft, a step of determining an actual offtake of mechanical power taken off by a first mechanical power offtake system of the auxiliary power unit, a step of comparing the maximum capacity for offtake of mechanical power and the actual offtake of mechanical power, a step of optimizing the offtake of mechanical power which step, based on the comparison of the maximum capacity for
(Continued)

offtake of mechanical power and the actual offtake of mechanical power, determines at least one corrective action. A device for managing the offtake of power produced by an auxiliary power unit of an aircraft and an aircraft including such a device are provided.

10 Claims, 2 Drawing Sheets

(51) Int. Cl.
    *F03D 9/28*         (2016.01)
    *F03D 9/32*         (2016.01)
    *F02C 6/08*          (2006.01)
    *B64D 41/00*       (2006.01)
    *B64D 13/06*       (2006.01)

(52) U.S. Cl.
    CPC ............... *F03D 9/28* (2016.05); *F03D 9/32* (2016.05); *B64D 2013/0611* (2013.01); *F05D 2220/50* (2013.01)

(56) References Cited

U.S. PATENT DOCUMENTS

| | | | |
|---|---|---|---|
| 2017/0237266 A1* | 8/2017 | Hatakeyama | H02J 4/00 307/24 |
| 2018/0170564 A1 | 6/2018 | Vaillant et al. | |
| 2020/0216180 A1 | 7/2020 | Szillat et al. | |
| 2020/0239155 A1 | 7/2020 | White | |

\* cited by examiner

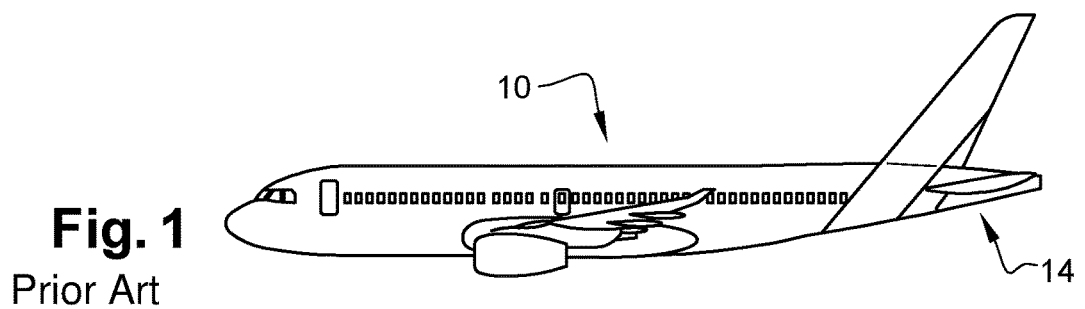
Fig. 1
Prior Art
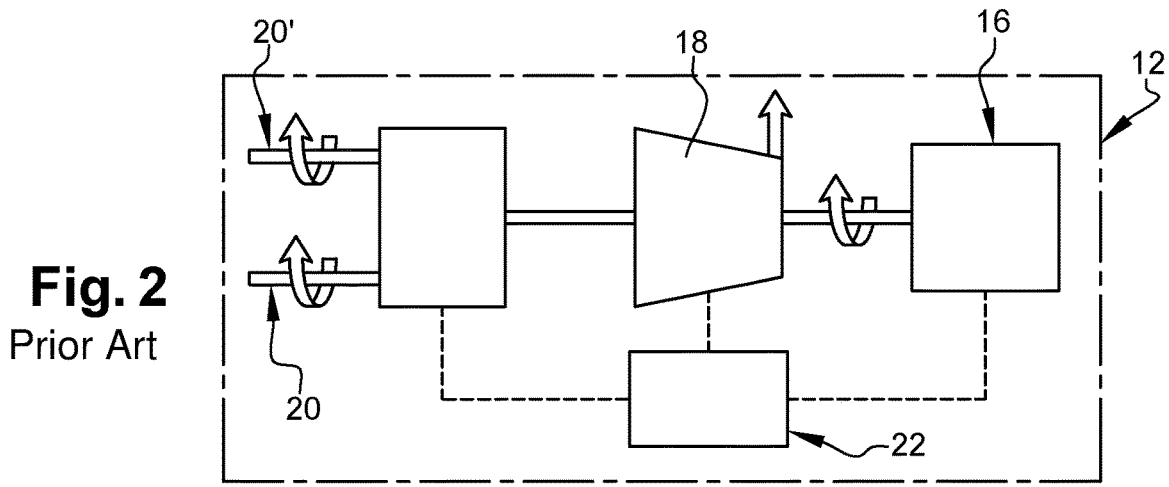
Fig. 2
Prior Art
Fig. 3
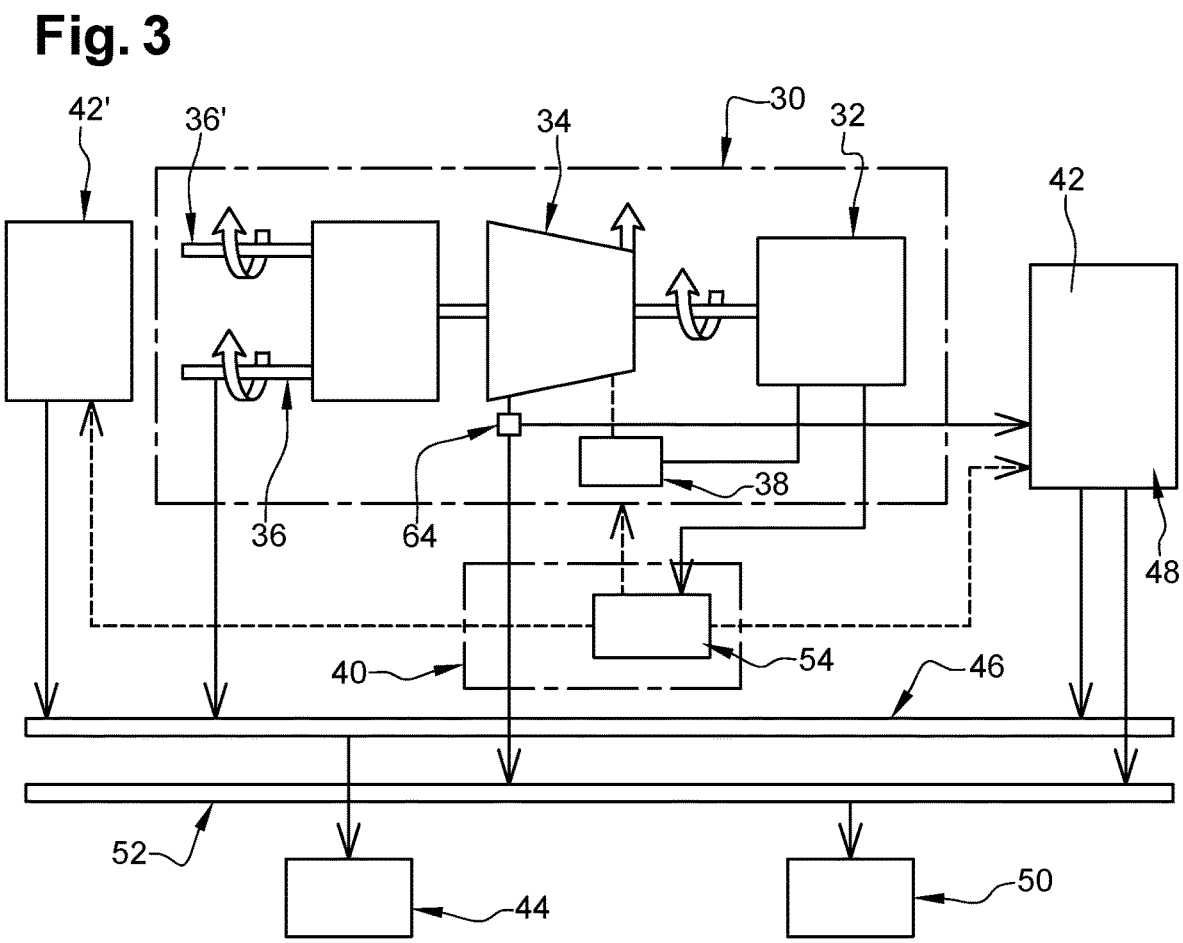

METHOD AND DEVICE FOR MANAGING THE OFFTAKE OF POWER PRODUCED BY AN AUXILIARY POWER UNIT OF AN AIRCRAFT AND AIRCRAFT EQUIPPED WITH SAID POWER OFFTAKE MANAGEMENT DEVICE

CROSS-REFERENCES TO RELATED APPLICATIONS

This application claims the benefit of the French patent application No. 2008258 filed on Aug. 4, 2020, the entire disclosures of which are incorporated herein by way of reference.

FIELD OF THE INVENTION

The present application relates to a method and to a device for managing the offtake of power produced by an aircraft auxiliary power unit and also to an aircraft equipped with the power offtake management device.

BACKGROUND OF THE INVENTION

According to one embodiment illustrated in FIG. 1, an aircraft 10 comprises an auxiliary power unit 12 (also referred to as an APU) positioned in the tailcone 14 of the aircraft 10. This auxiliary power unit 12 comprises a turbine engine 16, a pneumatic power offtake system 18, for example in the form of a compressor, at least one mechanical offtake system 20, 20' such as an alternator, for example, and various complementary items of equipment such as hydraulic pumps or a cooling system, for example, which are intended for the correct operation of the auxiliary power unit 12.

When the aircraft 10 is on the ground, the pneumatic power offtake system 18 is used notably to power at least one of the aircraft main engines when it starts, or the cabin air conditioning system. In one design, the auxiliary power unit 12 comprises a first mechanical power offtake system 20 converting the mechanical energy into electrical energy and acting as an electrical source, particularly during operations on the ground, and a second mechanical power offtake system 20' intended to supply the complementary equipment of the auxiliary power unit 12 with mechanical energy.

When the aircraft 10 is in flight, the auxiliary power unit 12 may constitute a topoff electrical and/or pneumatic power source supplementing the aircraft main engines, or an emergency energy source if one of the main engines should fail.

The auxiliary power unit 12 comprises a control unit (controller) 22 which is specific to it, configured to manage the power generated by the turbine engine 16 and direct it as needed. This control unit 22 comprises operating logic which manages the offtake of the power generated by the turbine engine 16 in the following way, when the aircraft is on the ground:

during the start up phase of at least one main engine, the pneumatic offtake system 18 takes priority, outside of the start up phase of at least one main engine, the mechanical offtake systems 20, 20' take priority, the remainder of the power generated being assigned to the pneumatic offtake system 18.

When the aircraft 10 is in flight, the auxiliary power unit may supply topoff pneumatic and/or electrical power, particularly in the takeoff phase, so that the majority of the power generated by each of the main engines is assigned to providing thrust.

Because the control unit 22 and its operating logic are devoted to the auxiliary power unit 12, it is difficult to manage the pneumatic and mechanical offtake systems of the auxiliary power unit 12 in the way that is optimal notably according to the other power sources of the aircraft, the energy requirements of the various loads of the aircraft, the circumstances of the flight, the phases of the flight, etc.

SUMMARY OF THE INVENTION

The present invention seeks to overcome all or some of the disadvantages of the prior art.

To this end, one subject of the invention is a method for managing the offtake of power produced by an auxiliary power unit of an aircraft, the auxiliary power unit comprising a power unit, at least one pneumatic power offtake system acting as a pneumatic-type power source for the aircraft and at least a first mechanical offtake system acting as an electrical-type power source for the aircraft, the aircraft comprising at least one other electrical-type power source, at least one electrical-type load and at least one pneumatic-type load; characterized in that the method comprises:

a step of calculating a maximum capacity for offtake of mechanical power that the auxiliary power unit can provide to the aircraft, a step of determining an actual offtake of mechanical power taken off by the first mechanical power offtake system, a step of comparing the maximum capacity for offtake of mechanical power and the actual offtake of mechanical power, a step of optimizing the offtake of mechanical power which step, on the basis of the comparison between the maximum capacity for offtake of mechanical power and the actual offtake of mechanical power, determines at least one corrective action.

Comparing the maximum capacity for offtake of mechanical power and the actual offtake of mechanical power means that it is possible to determine whether the first mechanical offtake system of the auxiliary power unit has excess offtake capacity and to adapt the operation of at least one pneumatic-/electrical-type power source of the aircraft and/or of at least one pneumatic-/electrical-type load of the aircraft according to this excess offtake capacity. Thus, the power generated by the auxiliary power unit is matched to the offtake demand of the aircraft.

According to another feature, the maximum capacity for offtake of mechanical power is calculated on the basis of a maximum capacity for offtake of power that the auxiliary power unit can provide to the aircraft, from which there is subtracted an actual offtake of pneumatic power taken off by the pneumatic power offtake system.

According to another feature, if the maximum capacity for offtake of mechanical power is greater than the actual offtake of mechanical power, then the corrective action is a first action aimed:

at allocating a surplus of electrical power produced by the first mechanical power offtake system to at least one electrical-type load and/or to a rechargeable electrical power source, and/or at increasing the offtake of pneumatic power performed by the pneumatic offtake system or systems of the auxiliary power unit, and/or at reducing the maximum power that the power unit of the auxiliary power unit can produce.

According to another feature, if the maximum capacity for offtake of mechanical power is less than the actual offtake of mechanical power then the corrective action is a second action aimed at reducing the electrical consumption of at least one electrical-type load and/or at increasing the electricity supply of another electrical-type power source.

According to another feature, the method comprises a step of comparing a pneumatic power requirement of at least one pneumatic-type load with the offtake pneumatic power taken off by the pneumatic power offtake system and a step of increasing the offtake of pneumatic power by reducing the offtake of mechanical power if the pneumatic power requirement is greater than the offtake of pneumatic power taken off by the pneumatic power offtake system and if the maximum capacity for offtake of mechanical power is greater than the actual offtake of mechanical power.

According to another feature, the method comprises a step of increasing the electricity supply of another electrical-type power source if the maximum capacity for offtake of mechanical power is not greater than the actual offtake of mechanical power so that it does become so.

Another subject of the invention is an aircraft comprising an auxiliary power unit comprising a power unit, at least one pneumatic power offtake system acting as a pneumatic-type power source for the aircraft and at least a first mechanical offtake system acting as an electrical-type power source for the aircraft; the aircraft also comprising at least one avionic system, at least one other electrical-type power source, at least one electrical-type load and at least one pneumatic-type load and at least one device for managing the offtake of power produced by the auxiliary power unit making it possible to implement a process according to one of the preceding characteristics. According to the invention, the device comprises a processing unit (processor) configured to calculate a maximum capacity for offtake of mechanical power that the auxiliary power unit can provide to the aircraft, and determine an actual offtake of mechanical power taken off by the first mechanical power offtake system and an optimization unit configured to compare the maximum capacity for offtake of mechanical power and the actual offtake of mechanical power and determine at least one corrective action on the basis of this comparison.

According to another feature, the processing unit and the optimization unit are integrated into the avionic system and/or into a centralized control unit configured to manage several pneumatic-type and/or mechanical-type power sources.

BRIEF DESCRIPTION OF THE DRAWINGS

Further features and advantages will emerge from the description of the invention which is to follow, which description is given solely by way of example, with reference to the attached drawings among which:

FIG. 1 is a side view of an aircraft,

FIG. 2 is a schematic depiction of an auxiliary power unit illustrating an embodiment of the prior art, FIG. 3 is a simplified schematic depiction of a device for managing the offtake of the power produced by an aircraft auxiliary power unit illustrating one embodiment of the invention.

DETAILED DESCRIPTION OF THE PREFERRED EMBODIMENTS

Figure 4:
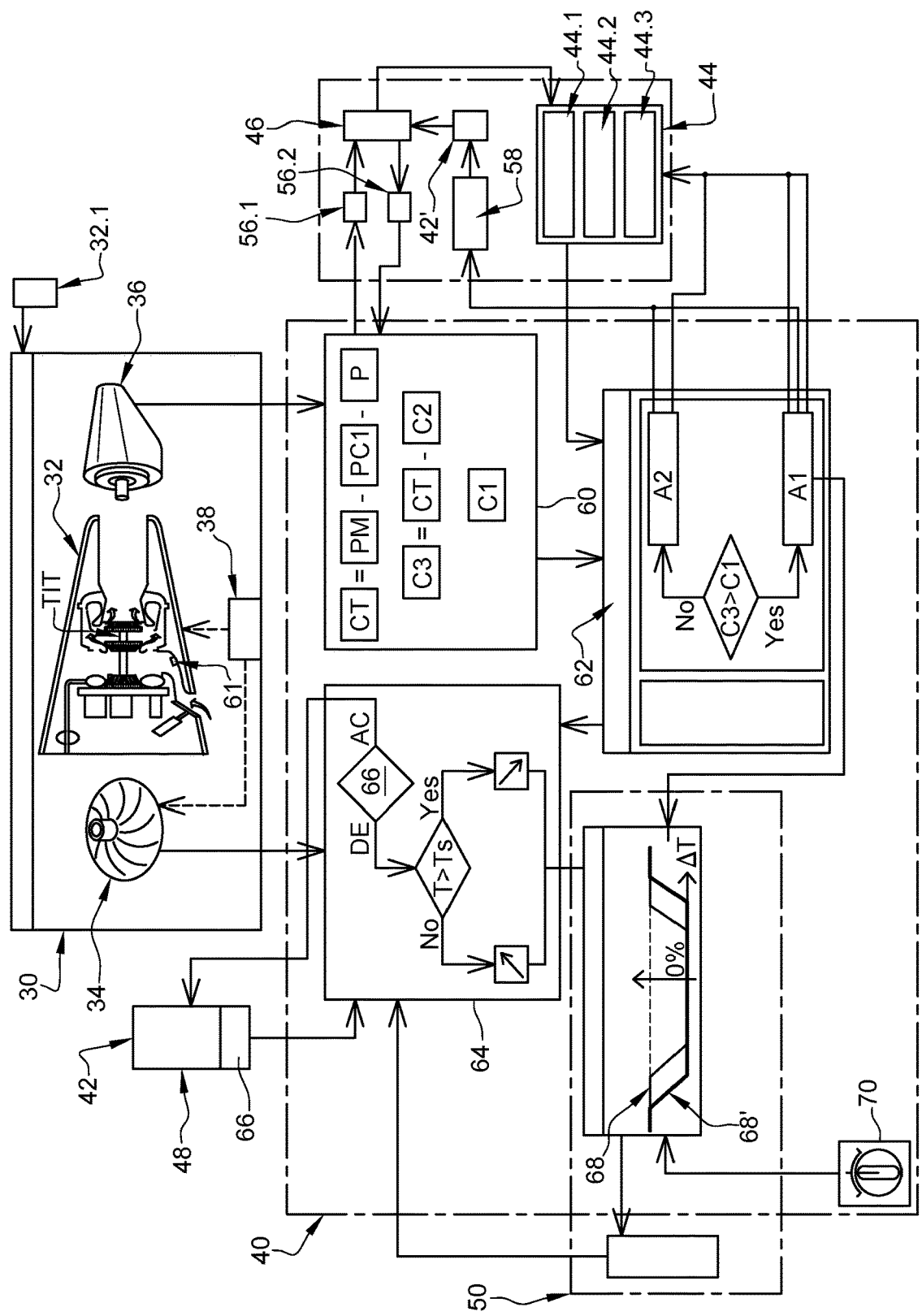
FIG. 4 is a detailed schematic depiction of a device for managing the offtake of the power produced by an aircraft auxiliary power unit, illustrating one embodiment of the invention.

As illustrated in FIG. 3, an aircraft comprises an auxiliary power unit 30 comprising a power unit 32 such as a turbine engine, for example, at least one pneumatic power offtake system 34 in the form of a charge compressor for example, at least one mechanical offtake system 36, 36' such as an alternator for example, and at least one complementary piece of equipment such as a hydraulic pump or a cooling system for example, intended for correct operation of the auxiliary power unit 30.

Thus, the pneumatic power offtake system 34 acts as a pneumatic-type power source for the aircraft.

In one design, the auxiliary power unit 30 comprises at least a first offtake system 36 for the offtake of mechanical power intended for the aircraft, converting mechanical energy into electrical energy and acting as an electrical-type power source for the aircraft, and at least a second offtake system 36' for the offtake of mechanical power intended for the auxiliary power unit 30, particularly for the complementary item or items of equipment of the auxiliary power unit 30.

The auxiliary power unit 30 may comprise an APU control unit 38 to manage the operation of the power unit 32 and of the pneumatic offtake system or systems 34.

The aircraft comprises a control 32.1 to control the activation or deactivation of the auxiliary power unit 30.

All of these elements of the auxiliary power unit 30 are not described further because they may be identical to those of the prior art.

The aircraft also comprises:

at least one avionic system 40 providing, amongst other things, control of certain items of aircraft electrical, hydraulic and pneumatic equipment;

at least one electrical assembly which comprises, in addition to the first mechanical offtake system 36 of the auxiliary power unit 30, at least one other electrical-type power source 42, 42', such as each of the main engines 42 of the aircraft or batteries 42' for example, at least one electrical-type load 44, at least one electrical network 46 connecting each electrical-type load 44 to at least one of the electrical-type power sources 36, 42, 42';

at least one pneumatic assembly which comprises, in addition to the pneumatic power offtake system 34 of the auxiliary power unit, at least one other pneumatic-type power source 48 such as each of the main engines for example, at least one pneumatic-type load 50 such as a cabin air conditioning system, for example, at least one pneumatic network 52 connecting each pneumatic-type load 50 to at least one of the pneumatic-type power sources 34, 48.

The aircraft comprises at least one centralized control unit 54 configured to manage several pneumatic-type, electrical-type and/or mechanical-type power sources 34, 36, 42, 42', 48 according to the power required notably for aircraft thrust and by the pneumatic-type and/or electrical-type loads 44, 50. The centralized control unit 54 may be integrated into the aircraft avionic system 40.

By way of example, according to one embodiment visible in FIG. 4, the electrical assembly comprises several electrical-type loads 44 such as a motor 44.1 for moving the aircraft around on the ground, aircraft cabin electrical equipment 44.2 or any other type of electrical load 44.3. It may comprise at least one electrical power supply equipment item 56.1 and at least one control system 56.2.

According to one embodiment, the batteries 42' are rechargeable and the electrical assembly comprises a battery management system 58.

All of these elements of the aircraft are not described further because they may be identical to those of the prior art.

A method for managing the offtake of the power produced by the auxiliary power unit 30 comprises a first step of determining a maximum power PM that the power unit 32 of the auxiliary power unit 30 is able to produce, a second step of determining a power PC1 consumed by the auxiliary power unit 30 in its operation, a third step of determining the conversion power losses P, a step of calculating a maximum capacity for offtake of power CT that the auxiliary power unit 30 is able to provide to the aircraft and which corresponds to the maximum power PM from which there are subtracted the power PC1 consumed by the auxiliary power unit 30 and the conversion power losses P.

According to one procedure, when the power unit 32 is a turbine engine, the maximum power PM that the power unit 32 is able to produce is determined, at a maximum temperature TIT of the gas inside the turbine engine (more specifically at the inlet to the turbine of the turbine engine) from at least one turbine engine performance simulation model and from at least one turbine engine condition of use such as the altitude of the aircraft or the temperature of the external air, for example. The turbine engine performance simulation model or models can be refined to take account of a coefficient of ageing K of the turbine engine. These models are generally devised by the manufacturer of the turbine engine.

This coefficient of ageing K may be periodically readjusted. To do that, the maximum power PM is calculated at a recalibration point such as after a determined number of hours of operation, at a high power given, for example, on the basis of the turbine engine performance simulation model, conditions of use of the turbine engine and the coefficient of ageing K. In parallel, the power actually consumed at the recalibration point is estimated on the basis of data obtained from the electrical-type and pneumatic-type loads. The coefficient of ageing K is periodically recalibrated so that the maximum power PM at the recalibration point and calculated on the basis of the turbine engine performance simulation model is substantially equal to the power actually consumed at that same recalibration point.

The conditions of use of the turbine engine are generally known by the centralized control unit 54 and/or by the aircraft avionics system 40.

The power PC1 consumed by the auxiliary power unit 30 during its operation can be determined on the basis of at least one characteristic of operation of the second mechanical power offtake system 36'. The power PC1 consumed by the auxiliary power unit 30 during its operation can be determined from at least one model that simulates the consumption of the auxiliary power unit 30.

The conversion power losses P are known and are dependent on the design of the elements that make up the auxiliary power unit 30. These conversion power losses P can be determined from at least one model simulating the conversion power losses P of the auxiliary power unit 30.

According to one embodiment, when the power unit 32 is a turbine engine, a device for managing the offtake of the power produced by the auxiliary power unit 30 comprises at least a processing unit 60 which, on the basis of information relating to the conditions of use of the auxiliary power unit 30, is configured to calculate the maximum capacity for offtake of power CT that the auxiliary power unit 30 is able to provide to the aircraft. This processing unit 60 may be integrated into the centralized control unit 54 or the avionic system 40.

In one configuration, the method for managing the offtake of the power produced by the auxiliary power unit 30 comprises a step of determining the actual offtake of pneumatic power C2 by the pneumatic power offtake system 34 of the auxiliary power unit 30 and a step of calculating a maximum capacity for offtake of mechanical power C3, at a maximum temperature TIT of the gas in the turbine engine (more specifically at the inlet to the turbine of the turbine engine), that the auxiliary power unit 30 is able to supply to the aircraft and which corresponds to the maximum power PM of the power unit 32 from which there are subtracted the power PC1 consumed by the auxiliary power unit 30, the actual offtake power C2 taken off by the pneumatic power offtake system 34 and the conversion power losses P.

According to one procedure, the actual offtake C2 of pneumatic power taken off by the pneumatic power offtake system 34 is determined from at least one of the characteristics of the pneumatic power offtake system 34 such as the charge compressor intake temperature, the mass flow rate passing through the charge compressor or the pressures upstream and downstream of the charge compressor, for example.

According to one embodiment, the device for managing the offtake of the power produced by the auxiliary power unit 30 comprises at least one sensor 61 configured to measure at least one of the characteristics of the pneumatic power offtake system 34 and emit a signal on the basis of the characteristic measured.

The processing unit 60 is then configured, on the basis of this signal and of information relating to the conditions of use of the auxiliary power unit 30, to calculate the maximum capacity for offtake of mechanical power C3 that the auxiliary power unit 30 can provide to the aircraft.

Whatever the procedure, the method for managing the offtake of the power produced by the auxiliary power unit 30 comprises a step of calculating the maximum capacity for offtake of mechanical power C3 that the auxiliary power unit 30 can provide to the aircraft on the basis of data supplied by the aircraft avionics system 40 and/or the centralized control unit 54 and by the auxiliary power unit 30. In parallel, the device for managing the offtake of the power produced by the auxiliary power unit 30 comprises a processing unit 60 configured to calculate the maximum capacity for offtake of mechanical power C3 that the auxiliary power unit 30 is able to provide to the aircraft on the basis of data supplied by the aircraft avionics system 40 and/or the centralized control unit 54 and by the auxiliary power unit 30.

In one configuration, the method for managing the offtake of the power produced by the auxiliary power unit 30 comprises a step of determining an actual offtake of mechanical power C1 taken off by the first mechanical power offtake system 36 of the auxiliary power unit 30 and a step of comparing the maximum capacity for offtake of mechanical power C3 and the actual offtake of mechanical power C1.

According to one procedure, when the first mechanical power offtake system 36 is in the form of a generator, the rotation speed of its shaft and the magnitude of the current leaving the generator can be used to determine the magnitude of the actual offtake of mechanical power C1.

The processing unit 60 is configured to determine, on the basis of data supplied by the auxiliary power unit 30, the actual offtake of mechanical power C1 taken off by the first mechanical power offtake system 36 of the auxiliary power unit 30 and compare it with the maximum capacity for offtake of mechanical power C3.

The method for managing the offtake of the power produced by the auxiliary power unit 30 comprises a step of optimizing the offtake of mechanical power which step, on the basis of the comparison of the maximum capacity for offtake of mechanical power C3 and the actual offtake of mechanical power C1, evaluates whether the capacity for the offtake of mechanical power is excessive or insufficient and determines at least one corrective action comprising matching the operation of at least one pneumatic-type/electrical-type power source of the aircraft and/or at least one pneumatic-type/electrical-type load of the aircraft according to this excess or insufficient capacity for the offtake of mechanical power.

According to one procedure, the method for managing the offtake of the power produced by the auxiliary power unit 30 comprises a step of calculating a difference between the maximum capacity for offtake of mechanical power C3 and the actual offtake of mechanical C1, the corrective action being determined according to this difference during the optimization step.

According to one embodiment, if the capacity for offtake of mechanical power is excessive, that is to say if the maximum capacity for the offtake of mechanical power C3 is greater than the actual offtake of mechanical power C1, then the corrective action is a first action A1 aimed:

at allocating the surplus electrical power produced by the first mechanical power offtake system 36 to at least one electrical-type load 44, such as at least one motor 44.1 for moving the aircraft around on the ground, for example, and/or to at least one rechargeable electrical-type power source such as a battery 42', for example, and/or at increasing the offtake of pneumatic power performed by the pneumatic offtake system or systems 34 of the auxiliary power unit 30 and at allocating this surplus pneumatic power to a pneumatic-type load 50 such as the cabin air conditioning system, or at reducing the maximum power PM that the power unit 32 of the auxiliary power unit 30 can produce in order to limit the fuel consumption.

If the capacity for offtaking mechanical power is insufficient, that is to say, if the maximum capacity for the offtake of mechanical power C3 is less than the actual offtake of mechanical power C1, then the corrective action is a second action A2 aimed at reducing the electrical consumption of at least one electrical-type load and/or at increasing the electricity supply of another electrical-type power source, for example by initiating the supply of electricity from a topoff source such as a battery 42'.

Whatever the embodiment, the maximum capacity for offtaking power CT or the maximum capacity for offtaking mechanical power C3 that the auxiliary power unit 30 is able to provide to the aircraft is known from the centralized control unit 54 and/or from the avionics system 40 which can then optimize the operation of each of the pneumatic-type/electrical-type power sources notably according to the requirements of the pneumatic-type/electrical-type loads and/or optimize the operation of the pneumatic-type/electrical-type loads according to the capacities of the pneumatic-type/electrical-type power sources.

According to one embodiment, the device for managing the offtake of the power produced by the auxiliary power unit 30 comprises an optimization unit 62 configured to compare the maximum capacity for offtake of mechanical power C3 and the actual offtake of mechanical power C1 and to determine at least one corrective action on the basis of this comparison. According to one embodiment, the optimization unit 62 is configured to calculate the difference between the maximum capacity for offtake of mechanical power C3 and the actual offtake of mechanical power C1 and to determine at least one corrective action on the basis of this difference.

The optimization unit 62 may be integrated into the avionics system 40 or into the centralized control unit 54.

According to one embodiment visible in FIG. 4, the pneumatic assembly comprises a control unit 64 configured to direct the pneumatic power taken off by the pneumatic power offtake system 34 toward at least one main engine 42 in order to start same and/or towards at least one pneumatic-type load 50 such as a cabin air conditioning system.

The aircraft also comprises at least one control 66 to start a main engine, which control is configured to occupy an activated state AC during the starting of the main engine 42 or a deactivated state DE the rest of the time.

According to one procedure, the method for managing the offtake of the power produced by the auxiliary power unit 30 comprises a step of determining the state of the start control 66 and a step of directing the pneumatic power taken off by the pneumatic power offtake system 34 according to the state of the start control 66. Thus, if the start control 66 is in the activated state AC, then the pneumatic power is directed towards the main engine 42. If the start control 66 is in the deactivated state DE, then the pneumatic power is directed to at least one of the pneumatic-type loads 50, notably according to its need for pneumatic power.

According to one configuration, the method for managing the offtake of the power produced by the auxiliary power unit 30 comprises a step of comparing a need for pneumatic power of at least one pneumatic-type load 50 and the pneumatic power taken off by the pneumatic power offtake system 34 and a step of increasing the offtake of pneumatic power by reducing the offtake of mechanical power if the need for pneumatic power is greater than the offtake of pneumatic power taken off by the pneumatic power offtake system 34 and if the maximum capacity for the offtake of mechanical power C3 is greater than the actual offtake of mechanical power C1.

In addition, the method for managing the offtake of the power produced by the auxiliary power unit 30 comprises a step of increasing the electricity supply of another electrical power source, such as the battery or batteries 42', if the maximum capacity for offtake of mechanical power C3 is not greater than the actual offtake of mechanical power C1 so that it becomes so.

According to one embodiment, the pneumatic power supplied by the pneumatic power offtake system 34 to at least one pneumatic-type load 50 such as the cabin air conditioning system follows at least one pneumatic control law 68 at least when the start control 66 is in the deactivated state DE.

In one application, the pneumatic control law 68 comprises comparing the temperature of the air T at least at a point in the cabin with a setpoint temperature Ts and in regulating a flow of mechanical power transmitted to the cabin air conditioning system on the basis of this comparison.

According to one procedure, the difference DT between the air temperature T at at least one point in the cabin and the setpoint temperature Ts is calculated.

If the difference DT is greater than a first value V1 (this corresponding to a deficit of cooling) then the flow of pneumatic power transmitted to the cabin air conditioning system is increased in order to increase the cooling capacity of the cabin air conditioning system.

If the difference DT is less than a second value V2 (this corresponding to a deficit of heating) then the flow of pneumatic power transmitted to the cabin air conditioning system is increased in order to increase the warming capacity of the cabin air conditioning system.

If the difference DT is comprised between the first and second values V1, V2 then the flow of pneumatic power transmitted to the cabin air conditioning system is set to a minimum value.

According to one embodiment, the pneumatic power supplied by the pneumatic power offtake system 34 alternately follows a number of pneumatic control laws 68, 68'. In that case, the aircraft comprises at least one selection control 70 for selecting a pneumatic control law from among the collection of pneumatic control laws 68, 68' so as to match the pneumatic control law 68, 68' to the weather conditions outside the aircraft.

In operation, even if the temperature outside the aircraft is high (or very low) and at the same time the pneumatic power offtake requirement is high, it is possible to adjust the offtake of mechanical power by reducing it so as to increase the offtake of the pneumatic power so as to always be able to meet the need or needs for pneumatic power.

The systems and devices described herein may include a controller or a computing device, sometimes referred to as a control or a control unit, comprising a processing unit and a memory which has stored therein computer-executable instructions for implementing the processes described herein. The processing unit, or other described units, may comprise any suitable devices configured to cause a series of steps to be performed so as to implement the method such that instructions, when executed by the computing device or other programmable apparatus, may cause the functions/acts/steps specified in the methods described herein to be executed. The processing unit, or other units, may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing the offtake of power produced by an auxiliary power unit of an aircraft, the auxiliary power unit comprising a power unit, at least one pneumatic power offtake system acting as a pneumatic power source for the aircraft and at least a first mechanical offtake system acting as an electrical power source for the aircraft, the aircraft comprising at least one other electrical power source, at least one electrical load and at least one pneumatic load; wherein the method comprises:
   a step of calculating a maximum capacity for offtake of mechanical power that the auxiliary power unit can provide to the aircraft,
   a step of determining an actual offtake of mechanical power taken off by the first mechanical power offtake system,
   a step of comparing the maximum capacity for the offtake of mechanical power and the actual offtake of mechanical power,
   a step of optimizing the offtake of mechanical power which step, based on the comparison between the maximum capacity for offtake of mechanical power and the actual offtake of mechanical power, determines at least one corrective action, and,
   a step of preforming the at least one corrective action.

2. The method according to claim 1, wherein the maximum capacity for offtake of mechanical power is calculated based on a maximum capacity for offtake of power that the auxiliary power unit can provide to the aircraft, from which there is subtracted an actual offtake of pneumatic power taken off by the at least one pneumatic power offtake system.

3. The method according to claim 1, wherein if the maximum capacity for offtake of mechanical power is greater than the actual offtake of mechanical power, then the corrective action is a first action aimed at at least one of:
- allocating a surplus of electrical power produced by the first mechanical power offtake system to the at least one of an electrical load or to a rechargeable electrical power source,
- increasing an offtake of pneumatic power performed by the at least one pneumatic offtake system or systems of the auxiliary power unit, or
- reducing a maximum power that the power unit of the auxiliary power unit can produce.

4. The method according to claim 1, wherein if the maximum capacity for offtake of mechanical power is less than the actual offtake of mechanical power then the corrective action is a second action aimed at at least one of reducing the electrical consumption of the at least one electrical load or at increasing an electricity supply of the at least one other electrical power source.

5. The method according to claim 1, wherein a pneumatic power provided by the at least one pneumatic power offtake system to the at least one pneumatic load follows at least one pneumatic control law.

6. The method according to claim 1, further comprising a step of comparing a pneumatic power requirement of the at least one pneumatic load with an offtake pneumatic power taken off by the pneumatic power offtake system and a step of increasing the offtake of pneumatic power by reducing the offtake of mechanical power if the pneumatic power requirement is greater than the offtake of pneumatic power taken off by the at least one pneumatic power offtake system and if the maximum capacity for offtake of mechanical power is greater than the actual offtake of mechanical power.

7. The method according to claim 6, further comprising a step of increasing an electricity supply of the at least one other electrical power source if the maximum capacity for offtake of mechanical power is not greater than the actual offtake of mechanical power so that it does become so.

8. An aircraft comprising an auxiliary power unit comprising:
- a power unit,
- at least one pneumatic power offtake system acting as a pneumatic power source for the aircraft and at least a first mechanical offtake system acting as an electrical power source for the aircraft,
- at least one avionic system,
- at least one other electrical power source,
- at least one electrical load,
- at least one pneumatic load, and
- a device for managing the offtake of power produced by the auxiliary power unit making it possible to implement a process according to claim 1,
wherein the device comprises:
- a processing unit configured to calculate a maximum capacity for offtake of mechanical power that the auxiliary power unit can provide to the aircraft, and determine an actual offtake of mechanical power taken off by the first mechanical power offtake system, and
- an optimization unit configured to compare the maximum capacity for offtake of mechanical power and the actual offtake of mechanical power, and determine at least one corrective action based on this comparison.

9. The aircraft according to the claim 8, wherein the processing unit and the optimization unit are integrated into at least one of the at least one avionic system or a centralized control unit configured to manage several power sources.

10. The aircraft according to claim 9, wherein the several power sources comprise at least one of pneumatic or mechanical power sources.

* * * * *